(12) United States Patent
Seidel et al.

(10) Patent No.: US 9,029,463 B2
(45) Date of Patent: May 12, 2015

(54) POLYCARBONATE BLENDS HAVING LOW-TEMPERATURE IMPACT STRENGTH

(75) Inventors: Andreas Seidel, Dormagen (DE); Evgueni Avtomonov, Leverkusen (DE); Dieter Wittmann, Leverkusen (DE); Achim Feldermann, Düsseldorf (DE)

(73) Assignee: Bayer Materialsciene AG, Leverkusen (DE)

( * ) Notice: Subject to any disclaimer, the term of this patent is extended or adjusted under 35 U.S.C. 154(b) by 676 days.

(21) Appl. No.: 12/467,920

(22) Filed: May 18, 2009

(65) Prior Publication Data

US 2009/0292059 A1     Nov. 26, 2009

(30) Foreign Application Priority Data

May 21, 2008   (DE) .......................... 10 2008 024 672

(51) Int. Cl.
| | |
|---|---|
| C08F 290/04 | (2006.01) |
| C08L 69/00 | (2006.01) |
| C08K 5/00 | (2006.01) |
| C08K 5/103 | (2006.01) |
| C08L 33/08 | (2006.01) |
| C08L 33/12 | (2006.01) |
| C08L 51/00 | (2006.01) |
| C08L 51/08 | (2006.01) |
| C08L 55/02 | (2006.01) |

(52) U.S. Cl.
CPC .............. *C08L 69/00* (2013.01); *C08L 69/005* (2013.01); *C08K 5/005* (2013.01); *C08K 5/103* (2013.01); *C08L 33/08* (2013.01); *C08L 33/12* (2013.01); *C08L 51/003* (2013.01); *C08L 51/085* (2013.01); *C08L 55/02* (2013.01)

(58) Field of Classification Search
CPC ................................................. C08L 2205/03
USPC .................... 524/127, 504, 508; 525/63, 67
See application file for complete search history.

(56) References Cited

U.S. PATENT DOCUMENTS

| | | | | |
|---|---|---|---|---|
| 5,280,070 | A * | 1/1994 | Drzewinski | 525/148 |
| 5,292,786 | A * | 3/1994 | Gaggar et al. | 524/127 |
| 2002/0099116 | A1 | 7/2002 | Nodera et al. | |
| 2004/0176505 | A1 * | 9/2004 | Seidel et al. | 524/115 |
| 2005/0031277 | A1 * | 2/2005 | Japon | 385/109 |
| 2007/0135568 | A1 * | 6/2007 | Eckel et al. | 525/63 |
| 2010/0160560 | A1 * | 6/2010 | Lee et al. | 525/101 |

FOREIGN PATENT DOCUMENTS

| | | |
|---|---|---|
| DE | 23 20 786 A1 | 11/1974 |
| EP | 0455116 | 11/1991 |
| EP | 0463368 | 1/1992 |
| EP | 1592740 | 11/2005 |
| JP | 124764 | 5/1991 |
| JP | 085749 | 4/1996 |
| JP | 269314 | 10/1996 |
| JP | 007869 | 1/1998 |
| JP | 2001-49072 A | 2/2001 |
| NL | 9002254 | 5/1992 |

OTHER PUBLICATIONS

Anderson et al (Macromolecules, vol. 14, p. 1599-1601, 1981).*
International Search Report, Jul. 9, 2009.

* cited by examiner

*Primary Examiner* — Wenwen Cai
(74) *Attorney, Agent, or Firm* — Miles & Stockbridge P.C.

(57) ABSTRACT

The present invention relates to a polycarbonate composition comprising polyalkyl(alkyl)acrylate having a specific molecular weight and an impact modifier, as well as to moulded bodies obtainable from these compositions. Compositions according to the present invention exhibit superior properties, in particular with respect of low-temperature strength and melt flowability.

18 Claims, No Drawings

POLYCARBONATE BLENDS HAVING LOW-TEMPERATURE IMPACT STRENGTH

CROSS-REFERENCE TO RELATED APPLICATIONS

This application claims priority from German Application No. 10 2008 024672.7 filed May 21, 2008, the content of which is incorporated herein by reference in its entirety.

BACKGROUND OF THE INVENTION

1. Field of the Invention

The invention relates generally to polycarbonate compositions comprising polyalkyl(alkyl)acrylate (co)polymers having a specific molecular weight and an impact modifier, and to moulded bodies obtainable from these compositions. The compositions according to the invention exhibit a good level of properties, in particular in respect of low-temperature impact strength and melt flowability, but also in respect of heat distortion resistance and volatile organic component (VOC) emissions.

2. Description of Related Art

EP-A 0 455 116 describes thermoplastically processable polyalkyl(alkyl)acrylate-containing compositions having improved thermal and mechanical properties and containing from 50 to 90 wt. % polymethyl methacrylate, from 5 to 40 wt. % polycarbonate and from 5 to 40 wt. % of a copolymer with polybutadiene as the strong phase constituent, the polymethyl methacrylate having a molecular weight of over 70,000 g/mol.

JP-A 1991/124764 discloses a non-pearlescent composition containing from 20 to 70 parts by weight aromatic polycarbonate, from 30 to 80 parts by weight polyalkyl(alkyl)acrylate and from 1 to 10 parts by weight of an acrylic polymer having a core-shell structure.

JP-A 1996/085749 discloses compositions having good stability to weathering and good mechanical properties, containing from 5 to 50 parts by weight polyalkyl(alkyl)acrylate, from 30 to 70 parts by weight polycarbonate, from 3 to 30 parts by weight ABS as impact modifier, and from 1 to 20 parts by weight talc of specific geometry.

JP-A 1996/269314 discloses thermoplastically processable compositions which are dimensionally stable under heat and have improved low-temperature impact strength and resistance to weathering and which contain from 1 to 99 parts by weight polycarbonate or polyester carbonate, from 1 to 99 parts by weight polyalkyl(alkyl)acrylate and from 0.5 to 50 parts by weight vinyl-monomer-grafted silicone-alkyl(meth)acrylate polymer composite rubber.

JP-A 1998/007869 discloses thermoplastically processable compositions which are dimensionally stable under heat, impact resistant and stable to weathering and which contain from 10 to 90 parts by weight polycarbonate, from 10 to 90 parts by weight polyalkyl(alkyl)acrylate and from 1 to 50 parts by weight impact modifier.

NL 9002254 describes blends having good low-temperature impact strength, comprising 57 wt. % polycarbonate, 18 wt. % ABS graft polymer and 25 wt. % polyalkyl(alkyl)acrylate having a weight-average molecular weight of 100,000 g/mol.

EP-A 0 463 368 discloses compositions of polycarbonate, PMMA, ABS and a monomeric phosphoric acid ester which are flame-resistant and are distinguished by improved weld line strength.

EP-A 1 592 740 describes flame-resistant compositions having good weld line strength, resistance to chemicals, elongation at break, heat distortion resistance and melt flowability, which contain aromatic polycarbonate, PMMA, styrene-, butadiene- and acrylonitrile-free graft polymer, and organic phosphoric acid ester.

Compositions previously disclosed all tend to contain polyalkyl(alkyl)acrylate having a high weight-average molecular weight—compared with compositions according to the invention—and have inadequate low-temperature impact strength and/or inadequate heat distortion resistance and/or inadequate melt flowability for use in many applications in automotive construction, in particular for components that are relevant in terms of safety.

SUMMARY OF THE INVENTION

It was an object of the present invention to provide polycarbonate compositions which are distinguished by an optimum combination of i) improved low-temperature impact strength, both in terms of the notched impact test and in the multiaxial penetration test, ii) improved melt flowability, and iii) a low emission of volatile organic compounds (in particular acrylonitrile). These advantages and objects can be achieved in many cases while maintaining heat distortion resistance and the tensile properties at a consistently high level.

It has now been found, surprisingly, that a desired property profile can be fulfilled by a composition comprising:
A) an aromatic polycarbonate or an aromatic polyester carbonate and/or a mixture thereof,
B) a (co)polymer of
   B.1) from 50 to 100 wt. %, based on component B, of alkyl or aryl methacrylate and/or alkyl or aryl acrylate containing $C_1$- to $C_{10}$-alkyl, cycloalkyl or aryl ester substituents,
   B.2) from 0 to 20 wt. %, based on component B, of acrylic acid or alkylacrylic acid compounds other than component B.1) and/or maleic acid compounds, and
   B.3) from 0 to 50 wt. %, based on component B, of vinyl aromatic compound,
C) a graft polymer, and
D) optionally at least one additive,
wherein the (co)polymer according to component B) has a weight-average molecular weight Mw (determined by GPC in THF at 40° C. with polystyrene as standard) of from 25,000 to 70,000 g/mol, preferably from 30,000 to 65,000 g/mol, particularly preferably from 40,000 to 62,000 g/mol, most particularly preferably from 50,000 to 60,000 g/mol.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

DETAILED DESCRIPTION OF A PREFERRED EMBODIMENT

The present invention provides in particular a composition comprising (or consisting essentially of, or consisting of)
A) from 40 to 93 parts by weight, preferably from 50 to 85 parts by weight, particularly preferably from 55 to 78 parts by weight (in each case based on the sum of the parts by weight of components A+B+C) of aromatic polycarbonate or aromatic polyester carbonate or mixtures thereof, B) from 5 to 40 parts by weight, preferably from 10 to 40 parts by weight, particularly preferably from 12 to 30 parts by weight (in each case based on the sum of the parts by weight of components A+B+C) of at least one (co)polymer of
- B.1) from 50 to 100 wt. %, based on component B, of alkyl or aryl methacrylate and/or alkyl or aryl acrylate containing $C_1$- to $C_{10}$-alkyl, cycloalkyl or aryl ester substituents, or mixtures of these monomers,
- B.2) from 0 to 20 wt. %, based on component B, of acrylic acid or alkylacrylic acid compounds other than component B.1) and/or maleic acid compounds, and
- B.3) from 0 to 50 wt. %, based on component B, of optionally substituted vinyl aromatic compounds, and C) from 2 to 40 parts by weight, preferably from 5 to 30 parts by weight, particularly preferably from 7 to 25 parts by weight (in each case based on the sum of the parts by weight of components A+B+C) of at least one graft polymer, D.1) from 0 to 5 parts by weight, preferably from 0 to 2.5 parts by weight, particularly preferably from 0 to 1 part by weight (in each case based on the sum of the parts by weight of components A+B+C) of a lubricant and/or mould release agent (for example, waxes such as pentaerythritol tetrastearate, other waxes, or polyethylene), D.2) from 0 to 5 parts by weight, preferably from 0 to 3 parts by weight, particularly preferably from 0 to 2 parts by weight, of an antistatic and/or conductivity additive, D.3) from 0 to 5 parts by weight, from 0 to 2 parts by weight, preferably from 0 to 1 part by weight (in each case based on the sum of the parts by weight of components A+B+C) of a stabiliser (for example, heat stabilisers, antioxidants, light stabilisers, processing stabilisers and hydrolytic stabilisers), D.4) from 0 to 7 parts by weight, preferably from 0 to 5 parts by weight, particularly preferably from 0 to 3 parts by weight (in each case based on the sum of the parts by weight of components A+B+C) of a colouring and/or pigment, D.5) from 0 to 10 parts by weight, preferably from 0 to 5 parts by weight, particularly preferably from 0 to 2 parts by weight (in each case based on the sum of the parts by weight of components A+B+C) of a mineral filler and/or reinforcing material, D.6) from 0 to 5 parts by weight, preferably from 0 to 2 parts by weight, particularly preferably from 0 to 1 part by weight (in each case based on the sum of the parts by weight of components A+B+C), in particular free of a flameproofing agent (for example, halogen-containing flameproofing agents and halogen-free flameproofing agents such as phosphoric acid esters), D.7) from 0 to 2 parts by weight, preferably from 0 to 0.5 part by weight, particularly preferably from 0 to 0.2 part by weight (in each case based on the sum of the parts by weight of components A+B+C), in particular free of a component selected from an antidripping agent and/or flameproofing synergist, and D.8) from 0 to 10 parts by weight, preferably from 0 to 5 parts by weight, particularly preferably from 0 to 2 parts by weight (in each case based on the sum of the parts by weight of components A+B+C), in particular free of a further polymeric or oligomeric compound, for example selected from the group of the vinyl (co)polymers other than component B, polyesters, polysulfones, polyketones, polyether ketones, polyether ether ketones, silicones, polyphenylene oxide and polymethylene oxide, wherein the (co)polymer according to component B) has a weight-average molecular weight Mw (determined by GPC in THF at 40° C. with polystyrene as standard) of from 25,000 to 70,000 g/mol, preferably from 30,000 to 65,000 g/mol, particularly preferably from 40,000 to 62,000 g/mol, most particularly preferably from 50,000 to 60,000 g/mol, all parts by weight in the present application being so normalised that the sum of the parts by weight of components A+B+C in the composition is 100.

Component A

Aromatic polycarbonates and/or aromatic polyester carbonates according to component A that are suitable according to the present invention are generally known in the literature and/or can be prepared by a process known in the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the preparation of aromatic polyester carbonates see e.g. DE-A 3 077 934).

The preparation of an aromatic polycarbonate can be carried out, for example, by reaction of diphenols with carbonic acid halides, preferably phosgene, and/or with aromatic dicarboxylic acid dihalides, preferably benzenedicarboxylic acid dihalides, according to the interfacial process, optionally using chain terminators, for example monophenols, and optionally using branching agents having a functionality of three or more than three, for example triphenols or tetraphenols. Preparation by a melt polymerisation process by reaction of diphenols with, for example, diphenyl carbonate is also possible.

Diphenols for the preparation of the aromatic polycarbonates and/or aromatic polyester carbonates can suitably comprise those of formula (I)

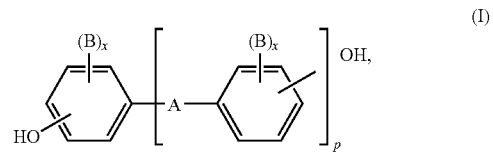

(I)

wherein

A is a single bond, $C_1$- to $C_5$-alkylene, $C_2$- to $C_5$-alkylidene, $C_5$- to $C_6$-cycloalkylidene, —O—, —SO—, , —CO—, —S—, —SO$_2$—, $C_6$- to $C_2$-arylene, to which further aromatic rings optionally containing heteroatoms can be fused, or a radical of formula (II) or (III)

(II)

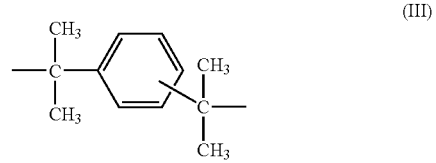

(III)

B is in each case $C_1$- to $C_{12}$-alkyl, preferably methyl, halogen, preferably chlorine and/or bromine, x each independently of the other is 0, 1 or 2, p is 1 or 0, and $R^5$ and $R^6$ can be chosen individually for each $X^1$ and each independently of the other is hydrogen or $C_1$- to $C_6$-alkyl, preferably hydrogen, methyl or ethyl, $X^1$ is carbon and m is an integer from 4 to 7, preferably 4 or 5, with the proviso that on at least one atom $X^1$, $R^5$ and $R^6$ are simultaneously alkyl.

Preferred diphenols include hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)ethers, bis-(hydroxyphenyl)-sulfoxides, bis-(hydroxyphenyl)-ketones, bis-(hydroxyphenyl)-sulfones and α,α-bis-(hydroxyphenyl)-diisopropyl-benzenes, and derivatives thereof brominated and/or chlorinated on the ring.

Particularly preferred diphenols include 4,4'-dihydroxydiphenyl, bisphenol-A, 2,4-bis(4-hydroxyphenyl)-2-methylbutane, 1,1-bis-(4-hydroxyphenyl)-cyclohexane, 1,1-bis-(4-hydroxy-phenyl)-3,3,5-trimethylcyclohexane, 4,4'-dihydroxydiphenyl sulfide, 4,4'-dihydroxydiphenylsulfone and di- and tetra-brominated or chlorinated derivatives thereof such as, for example, 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred in some embodiments.

The diphenols can be used on their own and/or in the form of arbitrary mixtures. The diphenols are known in the literature and/or are obtainable according to processes known in the literature.

Chain terminators suitable for the preparation of thermoplastic aromatic polycarbonates include, for example, phenol, p-chlorophenol, p-tert-butylphenol or 2,4,6-tribromophenol, but also long-chained alkylphenols, such as 4-[2-(2,4,4-trimethylpentyl)]-phenol, 4-(1,3-tetramethylbutyl)-phenol (such as according to DE-A 2 842 005) or monoalkylphenol or dialkylphenols having a total of from 8 to 20 carbon atoms in the alkyl substituents, such as 3,5-di-tert-butylphenol, p-isooctylphenol, p-tert-octylphenol, p-dodecylphenol and 2-(3,5-dimethylheptyl)-phenol and 4-(3,5-dimethylheptyl)-phenol. The amount of chain terminators to be used, in some embodiments, is generally from 0.5 mol % to 10 mol %, based on the molar sum of the diphenols used in a particular case.

The thermoplastic aromatic polycarbonates preferably have weight-average molecular weights ($M_w$, measured, for example, by GPC, ultracentrifugation or scattered light measurement, of from 22,000 to 35,000 g/mol, particularly preferably from 23,000 to 32,000 g/mol, in particular from 24,000 to 30,000 g/mol.

The thermoplastic aromatic polycarbonates can be branched in any known manner, preferably by the incorporation of from 0.05 to 2.0 mol %, based on the sum of the diphenols used, of at least one compound having a functionality of three or more than three, for example those having three or more phenolic groups.

Both homopolycarbonates and copolycarbonates are suitable. For the preparation of copolycarbonates of component A according to the present invention it is also possible to use from 1 to 25 wt. %, preferably from 2.5 to 25 wt. %, based on the total amount of diphenols to be used, of polydiorganosiloxanes having hydroxyaryloxy end groups. These are known (for example, from U.S. Pat. No. 3,419,634) and can be prepared according to processes known in the literature. The preparation of copolycarbonates containing polydiorganosiloxanes is described, for example, in DE-A 3 334 782.

Preferred polycarbonates in addition to the bisphenol A homopolycarbonates include the copolycarbonates of bisphenol A, advantageously with up to 15 mol %, based on the molar sums of diphenols, of diphenols other than those mentioned as being preferred or particularly preferred, in particular 2,2-bis(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether 4,4'-dicarboxylic acid and/or naphthalene-2,6-dicarboxylic acid.

Mixtures of the diacid dichlorides of isophthalic acid and terephthalic acid in a ratio of from 1:20 to 20:1 are particularly preferred in some cases.

In the preparation of polyester carbonates, a carbonic acid halide, preferably phosgene, can additionally be used concomitantly as a bifunctional acid derivative.

Suitable chain terminators for the preparation of the aromatic polyester carbonates, in addition to the monophenols already mentioned, also include chlorocarbonic acid esters thereof and the acid chlorides of aromatic monocarboxylic acids, which can optionally be substituted by $C_1$- to $C_{22}$-alkyl groups or by halogen atoms, as well as aliphatic $C_2$- to $C_{22}$-monocarboxylic acid chlorides, as examples.

The amount of chain terminators is preferably in each case from 0.1 to 10 mol %, based in the case of phenolic chain terminators on moles of diphenol and in the case of monocarboxylic acid chloride chain terminators on moles of dicarboxylic acid dichloride.

The aromatic polyester carbonates can also contain aromatic hydroxycarboxylic acids incorporated therein if desired for any reason.

The aromatic polyester carbonates can be both linear and branched in known manner (see in this connection, for example, DE-A 2 940 024 and DE-A 3 007 934).

There can be used as branching agents, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on dicarboxylic acid dichlorides used), or phenols having a functionality of three or more, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxy-phenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, preferably in an amount of from 0.01 to 1.0 mol %, based on diphenols used. Phenolic branching agents can be placed in a vessel with the diphenols; acid chloride branching agents can be introduced together with the acid dichlorides if desired.

The content of carbonate structural units in the thermoplastic aromatic polyester carbonates can vary as desired. The content of carbonate groups is preferably up to 100 mol %, in particular up to 80 mol %, particularly preferably up to 50 mol %, based on the sum of ester groups and carbonate groups. Both the esters and the carbonates contained in the aromatic polyester carbonates can be present in the polycondensation product in the form of blocks and/or distributed randomly.

The thermoplastic aromatic polycarbonates and polyester carbonates can be used on their own or in an arbitrary mixture.

Component B

In a preferred embodiment, component B is a (co)polymer of

B.1) from 50 to 100 wt. %, based on component B, of alkyl or aryl methacrylate and/or alkyl or aryl acrylate containing $C_1$- to $C_{10}$-alkyl, $C_5$-$C_{10}$-cycloalkyl or aryl ester substituents, or mixtures of these monomers, B.2) from 0 to 20 wt. %, based on component B, of acrylonitrile, methacrylonitrile, acrylamide, methacrylamide, 2-hydroxyethyl(meth)acrylic acid ester, maleic anhydride, maleic acid imides or mixtures of these monomers, and B.3) from 0 to 50 wt. %, based on component B, of vinyl aromatic compounds, which can optionally be substituted by alkyl and/or halogen, preferably by methyl and/or chlorine; component B.3 is preferably styrene, p-methylstyrene, α-methylstyrene or mixtures thereof.

Component B is preferably a (co)polymer of

B.1 from 80 to 100 wt. %, based on component B, of

B.1.1) from 80 to 100 wt. %, based on component B.1, of methyl methacrylate,

B.1.2) from 0 to 20 wt. %, based on component B.1, of (meth)acrylic acid $C_1$-$C_{10}$-alkyl esters, (meth)acrylic acid $C_5$-$C_{10}$-cycloalkyl esters or (meth)acrylic acid aryl esters other than methyl methacrylate, or mixtures thereof, and B.3) from 0 to 20 wt. %, based on component B, of styrene or p-methylstyrene.

Component B is particularly preferably polymethyl methacrylate. The preparation of component B can be carried out in any known manner by mass, solution or dispersion polymerisation of the monomer(s) (see, i.e., Kunststoff-Handbuch, Volume IX, Polymethacrylate, Carl Hanser Verlag Munich 1975, pages 22-37).

In one embodiment, it is possible that by addition of chain transfer reagents, especially sulfur containing chain transfer reagents, in particular mercaptans, the molecular weights of component B can preferably be adjusted so that the weight-average molecular weight Mw according to the present invention (determined by GPC in THF at 40° C. with polystyrene as standard) can be obtained.

In a preferred embodiment, component B can have a narrow molecular weight distribution: Component B advantageously has a ratio of weight-average to number-average molecular weight Mw/Mn, determined by GPC in THF at 40° C. with polystyrene as standard, of preferably from 1 to 2.5, particularly preferably from 1.3 to 2.2, most particularly preferably from 1.5 to 2.0.

Component C

Component C comprises one or more graft polymers of

C.1 from 10 to 90 wt. %, preferably from 20 to 60 wt. %, in particular from 25 to 50 wt. %, based on component C, of at least one vinyl monomer on C.2 from 90 to 10 wt. %, preferably from 80 to 40 wt. %, in particular from 75 to 50 wt. %, based on component C, of at least one graft base selected from the group consisting of diene rubbers, EP(D)M rubbers (i.e. those based on ethylene/propylene and optionally diene), acrylate, polyurethane, silicone, silicone acrylate, chloroprene and ethylene/vinyl acetate rubbers.

M The graft base C.2 generally has a mean particle size ($d_{50}$ value) of from 0.05 to 10 μm, preferably from 0.1 to 5 μm, particularly preferably from 0.2 to 1 μm.

Monomers C.1 are preferably at least one monomer selected from the group consisting of vinyl aromatic compounds and/or vinyl aromatic compounds substituted on the ring (such as, for example, styrene, α-methylstyrene, p-methylstyrene, p-chlorostyrene), vinyl cyanides (such as, for example, unsaturated nitriles such as acrylonitrile and methacrylonitrile), (meth)acrylic acid ($C_1$-$C_8$)-alkyl esters (such as, for example, methyl methacrylate, butyl acrylate), anhydrides of unsaturated carboxylic acids (such as, for example, maleic anhydride), and imides of unsaturated carboxylic acids (such as, for example, N-phenyl-maleimide).

Particularly preferred monomers C.1 include those selected from at least one of the monomers styrene, acrylonitrile, α-methylstyrene, methyl methacrylate, n-butyl acrylate, tert-butyl acrylate and maleic anhydride.

Most preferred monomers C.1 are styrene, n-butyl acrylate, tert-butyl acrylate and methyl methacrylate, in particular methyl methacrylate.

Preferred graft bases C.2 include silicone rubbers, silicone acrylate rubbers, diene rubbers (for example based on butadiene and isoprene) or mixtures of diene rubbers. Diene rubbers within the scope of the invention are also to be understood as including copolymers of diene rubbers or mixtures thereof with further copolymerisable monomers (for example, those according to C.1.1 and C.1.2). The graft bases C.2 generally have a glass transition temperature of <10° C., preferably <0° C., particularly preferably <−10° C.

Particularly preferred polymers C include, for example, ABS polymers and MBS polymers, preferably those prepared by emulsion polymerisation, as are described, for example, in DE-OS 2 035 390 (=U.S. Pat. No. 3,644,574) or in DE-OS 2 248 242 (=GB-PS 1 409 275) or in Ullmanns, Enzyklopädie der Technischen Chemie, Vol. 19 (1980), p. 280 ff. The gel content of the graft base C.2 is preferably at least 20 wt. %, in the case of graft bases C.2 prepared by emulsion polymerisation preferably at least 40 wt. % (measured in toluene).

The graft polymer of components C.1 and C.2 preferably has a core-shell structure, component C.1 forming the shell (also referred to as the jacket) and component C.2 forming the core (see, for example, Ullmann's Encyclopedia of Industrial Chemistry, VCH-Verlag, Vol. A21, 1992, page 635 and page 656).

The graft polymers C can suitably be prepared by radical polymerisation, for example by emulsion, suspension, solution or mass polymerisation, preferably by emulsion polymerisation.

Particularly suitable graft rubbers also include graft polymers C prepared by the emulsion polymerisation process by redox initiation with an initiator system comprising organic hydroperoxide and ascorbic acid, such as according to U.S. Pat. No. 4,937,285.

Because it is known that the graft monomers are not necessarily grafted onto the graft base completely during the graft reaction, graft polymers C according to the present invention are also understood as being those products which are obtained by (co)polymerisation of the graft monomers in the presence of the graft base and which are formed concomitantly during working up.

Suitable acrylate rubbers according to C.2 of the polymers C are preferably polymers of acrylic acid alkyl esters, optionally with up to 40 wt. %, based on C.2, of other polymerisable, ethylenically unsaturated monomers. The preferred polymerisable acrylic acid esters include $C_1$- to $C_8$-alkyl esters, for example methyl, ethyl, butyl, n-octyl and 2-ethylhexyl esters; haloalkyl esters, preferably halo-$C_1$-$C_8$-alkyl esters, such as chloroethyl acrylate, as well as mixtures of these monomers.

For crosslinking, monomers with more than one polymerisable double bond can be copolymerised. Preferred examples of crosslinking monomers are esters of unsaturated monocarboxylic acids having from 3 to 8 carbon atoms and unsaturated monohydric alcohols having from 3 to 12 carbon atoms, or saturated polyols having from 2 to 4OH groups and from 2 to 20 carbon atoms, such as ethylene glycol dimethacrylate, allyl methacrylate; polyunsaturated heterocyclic compounds, such as trivinyl and triallyl cyanurate; polyfunctional vinyl compounds, such as di- and tri-vinylbenzenes; but also triallyl phosphate and diallyl phthalate. Preferred crosslinking monomers include allyl methacrylate, ethylene glycol dimethacrylate, diallyl phthalate and heterocyclic compounds which contain at least three ethylenically unsaturated groups. Particularly preferred crosslinking monomers are the cyclic monomers triallyl cyanurate, triallyl isocyanurate, triacryloylhexahydro-s-triazine, triallylbenzenes. The amount of crosslinking monomers is preferably from 0.02 to 5 wt. %, in particular from 0.05 to 2 wt. %, based on the graft base C.2. In the case of cyclic crosslinking monomers having at least three ethylenically unsaturated groups, it may be advantageous to limit the amount to less than 1 wt. % of the graft base C.2.

Preferred "other" polymerisable, ethylenically unsaturated monomers which can optionally be used in addition to the acrylic acid esters for preparing the graft base C.2 are, for example, acrylonitrile, styrene, α-methylstyrene, acrylamides, vinyl $C_1$-$C_6$-alkyl ethers, methyl methacrylate, butadiene. Preferred acrylate rubbers as the graft base C.2 include emulsion polymers which have a gel content of at least 60 wt. %.

Suitable silicone rubbers according to C.2 can be prepared, for example, by emulsion polymerisation, as described, for example, in U.S. Pat. No. 2,891,920 and U.S. Pat. No. 3,294,725. Further suitable graft bases according to C.2 include silicone rubbers having graft-active sites, as are described, for example, in DE-OS 3 704 657, DE-OS 3 704 655, DE-OS 3 631 540 and DE-OS 3 631 539.

Silicone acrylate rubbers are also suitable according to the present invention as graft bases C.2. These silicone acrylate rubbers are typically composite rubbers with graft-active sites having a silicone rubber content of preferably from 10 to 90 wt. % and a polyalkyl(meth)acrylate rubber content of preferably from 90 to 10 wt. %, it being possible for the two mentioned rubber components to interpenetrate in the composite rubber so that they cannot be substantially separated from one another, or to have a core-shell structure. Silicone acrylate rubbers are known and are described, for example, in U.S. Pat. No. 5,807,914, EP 430134 and U.S. Pat. No. 4,888,388. Preference is given to the use of graft polymers based on silicone acrylate rubbers which have been prepared by emulsion polymerisation, with C.1 methyl methacrylate or C1.1 styrene and C1.2 acrylonitrile.

The gel content of the graft base C.2 is determined at 25° C. in a suitable solvent (M. Hoffmann, H. Krömer, R. Kuhn, Polymeranalytik I und II, Georg Thieme-Verlag, Stuttgart 1977).

The mean particle size $d_{50}$ is the diameter above and below which in each case 50 wt. % of the particles lie. It can be determined by means of ultracentrifuge measurement (W. Scholtan, H. Lange, Kolloid, Z. und Z. Polymere 250 (1972), 782-1796).

Component D

The compositions according to the invention can further comprise additives (polymer additives), in so far as and in such an amount that they do not substantially impair the low-temperature impact strength and heat distortion resistance of the compositions. In this connection, a composition according to the present invention, in a preferred embodiment, has a Vicat B120 heat distortion temperature according to ISO306 of at least 110° C., most preferably of at least 115° C., and can be processed at suitable processing temperatures to moulded bodies which still exhibit a strong fracture behaviour in the notched impact test according to ISO 180-1A, preferably at −10° C., most preferably even at −20° C.

Compositions according to the present invention can be prepared, for example, by mixing the constituents in a known manner and melt compounding and melt extruding the mixture at temperatures of from 200° C. to 340° C., preferably at from 250° C. to 300° C., in conventional devices such as internal kneaders, extruders and twin-shaft screws.

Mixing of the individual constituents can be carried out, in any known manner, either in succession or simultaneously, either at about 20° C. (room temperature) or at a higher temperature.

Compositions according to the present invention can be used in the production of mouldings of any kind. These can be produced, for example, by injection moulding, extrusion and/or blow moulding processes. A further form of processing is the production of moulded bodies by deep-drawing from previously produced sheets or films.

The present invention therefore also provides a process for the preparation of the composition, the use thereof, for example, in the production of a moulding, and the mouldings themselves.

Examples of such mouldings include films, profiles, casing parts of any kind, for example for domestic appliances such as juice extractors, coffee makers, mixers; for office equipment such as monitors, printers, copiers; also sheets, tubes, conduits for electrical installations, profiles for the construction sector, interior fitting and external applications; parts from the electrical engineering field, such as switches and plugs, as well as automotive interior and exterior components.

In particular, compositions according to the present invention can be used, for example, in the production of one or more of the following kinds of mouldings, as well as others:

Parts for the interior finishing of railway vehicles, ships, aircraft, buses and motor vehicles, casings for electrical devices containing small transformers, casings for devices for disseminating and transmitting information, casings and coverings for medical purposes, massage devices and casings therefor, toy vehicles for children, prefabricated wall panels, casings for security devices, mouldings for sanitary and bathroom fittings, cover grids for ventilator openings, casings for garden equipment, and the like.

The examples which follow serve to explain the invention further.

EXAMPLES

The components indicated in Table 1 and explained briefly hereinbelow were melt compounded on a ZSK-25 at 260° C. The test specimens were produced on an Arburg 270 E injection moulding machine at 260° C. or at 300° C.

Component A

Linear polycarbonate based on bisphenol A having a weight average molecular weight ($\overline{M}_w$), measured according to GPC in dichloromethane, of 28,000 g/mol.

Component B-1

Polymethyl methacrylate having a weight-average molecular weight ($\overline{M}_w$), determined by GPC in THF at 40° C. with polystyrene as standard, of 74,000 g/mol and a Mw/Mn ratio of 1.9.

Component B-2
Polymethyl methacrylate having a weight-average molecular weight ($\overline{M}_w$), determined by GPC in THF at 40° C. with polystyrene as standard, of 58,000 g/mol and a Mw/Mn ratio of 1.9.
Component B-3
Polymethyl methacrylate having a weight-average molecular weight ($\overline{M}_w$), determined by GPC in THF at 40° C. with polystyrene as standard, of 15,000 g/mol.
Component C-1
ABS graft polymer of 40 parts by weight of a copolymer of styrene and acrylonitrile in a weight ratio of 72:28 on 60 parts by weight of crosslinked polybutadiene rubber, produced by emulsion polymerisation, having a mean particle diameter of $d_{50}$=0.3 μm and with a core-shell structure.
Component D
Component D-1:
Pentaerythritol tetrastearate (PETS)
Component D-2:
Heat stabiliser consisting of 50 wt. %, based on component D-2, of Irganox 1076 and 50 wt. %, based on component D-2, of Irganox B900 (both Ciba Specialty Chemicals, Basel, Switzerland).

The notched impact strength is determined on test rods of dimensions 80 mm×10 mm×4 mm according to ISO 180-1A at room temperature [$a_k$(23° C.)] and also stepwise at 10° C. intervals down to −30° C. The ductile-brittle temperature is determined as the temperature at which the transition from ductile to brittle fracture behaviour is observed. The notched impact strengths and ductile-brittle transition temperatures are determined on test rods which were produced by injection moulding at a melting temperature of a) 260° C. and b) 300° C.

The Vicat B120 value, determined on test rods of dimensions 80 mm×10 mm×4 mm according to ISO 306, is used as the measure for the heat distortion resistance.

The melt volume-flow rate (MVR), determined according to ISO 1133 at 260° C. with a die load of 5 kg, and the melt viscosity, determined according to ISO 11443 at 260° C. and with a shear rate of 1000 s$^{-1}$, are used as the measure for the melt flowability.

The modulus of elasticity, the yield stress and the elongation at break are determined in the tensile test according to ISO 527.

The emission of volatile organic compounds (VOCs) is determined according to VDA 277 on test specimens of dimensions 80 mm×10 mm×4 mm which were produced by the injection moulding process at 260° C. and 300° C.

Residual contents of acrylonitrile monomers are determined by means of headspace processes on test rods of dimensions 80 mm×10 mm×4 mm which were produced by the injection moulding process at 260° C. and 300° C.

A summary of the properties of the composition according to the invention, or of test specimens obtained therefrom, is given in Table 1.

TABLE 1

| | | Moulding compositions and their properties | | |
|---|---|---|---|---|
| | | 1 (comparison) | 2 | 3 (comparison) |
| Components [parts by weight] | | | | |
| A | (PC) | 58 | 58 | 58 |
| B-1 | (PMMA, 74,000 g/mol) | 24 | — | — |
| B-2 | (PMMA, 58,000 g/mol) | — | 24 | — |
| B-3 | (PMMA, 15,000 g/mol) | — | — | 24 |
| C | (ABS graft polymer) | 18 | 18 | 18 |
| D-1 | (PETS) | 0.75 | 0.75 | 0.75 |
| D-2 | (Heat stabiliser) | 0.2 | 0.2 | 0.2 |
| Properties | | | | |
| $a_K$ (23° C.) - 260° C. [kJ/m$^2$] | | 39 | 41 | 22 |
| $a_K$ (23° C.) - 300° C. [kJ/m$^2$] | | 32 | 35 | 11 |
| $a_K$-ductile-brittle transition temperature - 260° C. [° C.] | | −5 | −25 | >25° C. |
| $a_K$-ductile-brittle transition temperature - 300° C. [° C.] | | 15 | 0 | >25° C. |
| Vicat B120 [° C.] | | 123 | 120 | 121 |
| MVR (260° C./5 kg) [ml/10 min] | | 11 | 15 | 33 |
| Melt viscosity (260° C./1000 s$^{-1}$) [Pa · s] | | 364 | 297 | 245 |
| Modulus of elasticity [MPa] | | 2009 | 2003 | 2081 |
| Yield stress [N/mm$^2$] | | 54 | 53 | 55 |
| Tensile strain at break [%] | | 104 | 115 | 42 |
| Residual content of acrylonitrile monomer - 260° C. [ppm] | | 1.2 | 1.1 | 0.6 |
| Residual content of acrylonitrile monomer - 300° C. [ppm] | | 2.6 | 1.9 | 1.5 |
| VOC emission - 260° C. [mg C/kg] | | 20 | 17 | 64 |
| VOC emission - 300° C. [mg C/kg] | | 40 | 35 | 112 |

The data in Table 1 show that composition 2 according to the present invention containing a PMMA of weight-average molecular weight Mw of 58,000 g/mol has better melt flowability than Comparison Example 1, which contains a PMMA having the higher molecular weight (Mw of 74,000 g/mol). In addition, composition 2 according to the invention surprisingly also exhibits an improvement in the low-temperature notched impact strengths. The heat distortion resistance and the tensile properties of both compositions are at a comparably high level. The demands made by the automotive industry in respect of the emission of volatile organic compounds are met by composition 2 according to the present invention at a processing temperature of 260° C. and also at a comparatively high processing temperature of 300° C. Likewise, a composition according to the present invention has a low residual content of acrylonitrile, the increase in the acrylonitrile content at higher processing temperatures surprisingly being smaller than in the case of the comparable composition, corresponding to the prior art, containing PMMA having a higher molecular weight. The data in Table 1 also show that comparative composition 3 containing a PMMA of further reduced weight-average molecular weight (Mw of 15,000 g/mol) as expected has better melt flowability than composition 2, but significantly deteriorated mechanical properties (impact strength and tensile elongation at break). Furthermore, such composition 3 shows significantly higher emissions of volatile organic compounds (VOCs) and does, hence, not meet the according demands made by the automotive industry.

In summary, it can be concluded that a composition that has a PMMA included wherein the weight average molecular weight thereof is less than about 70,000 g/mol, has both a surprisingly superior melt flowability and superior mechanical performance (low-temperature ductility) as well as low VOC emissions. Particularly, preferably, the Mw is from 25,000-70,000 g/mol, more preferably from 30,000-65,000 g/mol. In conclusion, only the compositions containing PMMA with weight-average molecular weight as specified in the presently claimed invention exhibit both improved melt flow and mechanical performance (low-temperature ductility) as well as low VOC emissions.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

All documents referred to herein are specifically incorporated herein by reference in their entireties.

As used herein and in the following claims, articles such as "the", "a" and "an" can connote the singular or plural.

The invention claimed is:

1. A composition comprising
   A) from 55 to 78 parts by weight of at least one aromatic polycarbonate and/or aromatic polyester carbonate,
   B) from 12 to 30 parts by weight of polymethyl methacrylate,
   C) from 7 to 25 parts by weight of a graft polymer of,
      C.1 from 25 to 50 wt. %, based on the component C, of at least one vinyl monomer on
      C.2 from 75 to 50 wt. %, based on the component C, of at least one graft base selected from the group consisting of diene rubbers, EP(D)M rubbers, acrylate, polyurethane, silicone, silicone acrylate, chloroprene and ethylene/vinyl acetate rubbers,
   D.1) from 0 to 5 part by weight of at least one lubricant and/or mould release agent,
   D.2) from 0 to 5 part by weight of at least one antistatic and/or conductivity additive,
   D.3) from 0 to 5 part by weight of at least one stabilizer,
   D.4) from 0 to 7 part by weight of at least one colouring and/or pigment,
   D.5) from 0 to 10 part by weight of at least one mineral filler and/or reinforcing material,
   D.7) from 0 to 2 part by weight of at least one antidripping agent and/or flameproofing synergist, and
   D.8) from 0 to 10 parts by weight of at least one further polymeric or oligomeric compound, the parts by weight in each case being based on the sum of the parts by weight of the components A+B+C,
   wherein the aromatic polycarbonate according to the component A has a weight-average molecular weight Mw determined by GPC of from 24,000 to 30,000 g/mol, and wherein the polymethyl methacrylate according to the component B has a weight-average molecular weight Mw, determined by GPC in THF at 40° C. with polystyrene as standard, of from 30,000 to 65,000 g/mol,and wherein the ratio of weight-average to number-average molecular weight Mw/Mn of the polymethyl methacrylate according to the component B, determined by GPC in THF at 40° C. with polystyrene as standard, has a value from 1 to 2.5.

2. The composition according to claim 1, wherein the polymethyl methacrylate according to the component B has a weight-average molecular weight Mw, determined by GPC in THF at 40° C. with polystyrene as standard, of from 40,000 to 62,000 g/mol.

3. The composition according to claim 1, wherein the composition is free of flameproofing agent (D.6) and antidripping agent and flameproofing synergists (D.7).

4. The composition of claim 1 having a Vicat B120 heat distortion temperature measured according to ISO 306 of at least 110° C.

5. The composition of claim 1, wherein the transition from ductile to brittle fracture behavior in the notched impact test according to ISO 180-1A occurs at a temperature of -10° C. or lower.

6. The composition of claim 5, wherein the transition from ductile to brittle fracture behavior in the notched impact test according to ISO 180-1A occurs at a temperature of -20° C. or lower.

7. The composition of claim 1 comprising a total emission of volatile organic compounds measured according to VDA 277 of less than about 50 mg carbon equivalents per kg.

8. The composition of claim 1 having a residual acrylonitrile content measured by headspace method of less than about 2 ppm.

9. The composition according to claim 1, wherein the polymethyl methacrylate according to the component B has a weight-average molecular weight Mw, determined by GPC in THF at 40° C. with polystyrene as standard, of from 50,000 to 60,000 g/mol.

10. The composition according to claim 1, wherein the component C is an ABS polymer or MBS polymer.

11. The composition of claim 1 comprising a total emission of volatile organic compounds measured according to VDA 277 of less than about 35 mg carbon equivalents per kg.

12. A process for the production of the composition according to claim 1, comprising mixing the components A, B, C and optionally D to form a mixture and melt compounding or melt extruding the mixture at an elevated temperature.

13. The process of claim 12, wherein said elevated temperature is from 200° -340° C.

14. A method for production of a moulding comprising forming a moulding comprising the composition of claim 1.

15. A moulding comprising the composition according to claim 1.

16. A composition consisting of
   A) from 55 to 78 parts by weight of at least one aromatic polycarbonate and/or aromatic polyester carbonate,
   B) from 12 to 30 parts by weight of polymethyl methacrylate,
   C) from 7 to 25 parts by weight of a graft polymer of,
      C.1 from 25 to 50 wt. %, based on the component C, of at least one vinyl monomer on
      C.2 from 75 to 50 wt. %, based on the component C, of at least one graft base selected from the group consisting of diene rubbers, EP(D)M rubbers, acrylate, polyurethane, silicone, silicone acrylate, chloroprene and ethylene/vinyl acetate rubbers,
   D.1) from 0 to 5 part by weight of at least one lubricant and/or mould release agent,
   D.2) from 0 to 5 part by weight of at least one antistatic and/or conductivity additive,
   D.3) from 0 to 5 part by weight of at least one stabilizer,
   D.4) from 0 to 7 part by weight of at least one colouring and/or pigment,
   D.5) from 0 to 10 part by weight of at least one mineral filler and/or reinforcing material,
   D.6) from 0 to 5 part by weight of at least one flameproofing agent,
   D.7) from 0 to 2 part by weight of at least one antidripping agent and/or flameproofing synergist, and D.8) from 0 to 10 parts by weight of at least one further polymeric or oligomeric compound, the parts by weight in each case being based on the sum of the parts by weight of the components A+B+C, wherein the aromatic polycarbonate according to the component A has a weight-average molecular weight Mw determined by GP of from 24,000 to 30,000 g/mol, wherein the polymethyl methacrylate according to the component B has a weight-average molecular weight Mw, determined by GPC in THF at 40° C. with polystyrene as standard, of from 30,000 to 65,000 g/mol, and wherein the ratio of weight-average to number-average molecular weight Mw/Mn of the polymethyl methacrylate according to the component B, determined by GPC in THF at 40° C. with polystyrene as standard, has a value from 1 to 2.5.

17. The composition according to claim 16, consisting of
A) from 55 to 78 parts by weight of the at least one aromatic polycarbonate and/or aromatic polyester carbonate,
B) from 12 to 30 parts by weight of the polymethyl methacrylate,
C) from 7 to 25 parts by weight of a the graft polymer of,
   C.1 from 25 to 50 wt. %, based on the component C, of at least one vinyl monomer on
   C.2 from 75 to 50 wt. %, based on the component C, of at least one graft base selected from the group consisting of diene rubbers, EP(D)M rubbers, acrylate, polyurethane, silicone, silicone acrylate, chloroprene and ethylene/vinyl acetate rubbers,
D.1) from 0 to 5 part by weight of the at least one lubricant and/or mould release agent,
D.2) from 0 to 5 part by weight of the at least one antistatic and/or conductivity additive,
D.3) from 0 to 5 part by weight of the at least one stabilizer,
D.4) from 0 to 7 part by weight of the at least one colouring and/or pigment,
D.5) from 0 to 10 part by weight of the at least one mineral filler and/or reinforcing material, and
D.8) from 0 to 10 parts by weight of the at least one further polymeric or oligomeric compound.

18. The composition according to claim 16, consisting of
A) from 55 to 78 parts by weight of the at least one aromatic polycarbonate and/or aromatic polyester carbonate,
B) from 12 to 30 parts by weight of the polymethyl methacrylate,
C) from 7 to 25 parts by weight of the a graft polymer of,
   C.1 from 25 to 50 wt. %, based on the component C, of at least one vinyl monomer on
   C.2 from 75 to 50 wt. %, based on the component C, of at least one graft base selected from the group consisting of diene rubbers, EP(D)M rubbers, acrylate, polyurethane, silicone, silicone acrylate, chloroprene and ethylene/vinyl acetate rubbers,
D.1) from 0 to 5 part by weight of the at least one lubricant and/or mould release agent,
D.2) from 0 to 5 part by weight of the at least one antistatic and/or conductivity additive,
D.3) from 0 to 5 part by weight of the at least one stabilizer,
D.4) from 0 to 7 part by weight of the at least one colouring and/or pigment, and
D.5) from 0 to 10 part by weight of the at least one mineral filler and/or reinforcing material.

* * * * *